US012722559B2

(12) United States Patent
Zhang et al.

(10) Patent No.: US 12,722,559 B2
(45) Date of Patent: Sep. 1, 2026

(54) SPIRAL VEHICLE BOX SLIDE-OUT SYSTEM

(71) Applicants: Xinfang Zhang, Springfield, MO (US); Xiaopu Zhang, Springfield, MO (US)

(72) Inventors: Xinfang Zhang, Springfield, MO (US); Xiaopu Zhang, Springfield, MO (US)

( * ) Notice: Subject to any disclaimer, the term of this patent is extended or adjusted under 35 U.S.C. 154(b) by 245 days.

(21) Appl. No.: 18/784,918

(22) Filed: Jul. 26, 2024

(65) Prior Publication Data

US 2026/0027961 A1 Jan. 29, 2026

(51) Int. Cl.
*B60P 3/34* (2006.01)

(52) U.S. Cl.
CPC .................................... *B60P 3/34* (2013.01)

(58) Field of Classification Search
CPC ........................................................ B60P 3/34
USPC .................... 296/1.01, 165, 172, 26.13, 171
See application file for complete search history.

(56) References Cited

U.S. PATENT DOCUMENTS 5,787,650 A * 8/1998 Miller ...................... B60P 3/34 296/26.14
6,152,520 A * 11/2000 Gardner ................. B60P 3/341 52/79.5
6,266,931 B1 * 7/2001 Erickson .................. B60P 3/34 296/165
6,471,275 B1 * 10/2002 Kunz ....................... B60P 3/34 296/171
6,536,821 B1 * 3/2003 Gardner ................... B60P 3/34 296/26.14
6,928,773 B1 * 8/2005 Gardner ................... B60P 3/34 52/143

* cited by examiner

*Primary Examiner* — Amy R Weisberg
*Assistant Examiner* — Daniel R Digiovannantonio

(57) ABSTRACT

The present application relates to a spiral vehicle compartment slide-out system, which includes a spiral movement component, a drive device, support frame, and a bearing box. These components are integrally arranged inside the bearing boxes located on the lower part of the box on both sides. There is no need to disassemble the vehicle's chassis; instead, by simply fixing the support frame to the vehicle body, the slide-out compartment can be positioned at the opening of the vehicle body. This application enables the sliding out of the vehicle compartment, increasing usable space, and offers convenient installation and removal, as well as neatness and aesthetic appeal.

12 Claims, 10 Drawing Sheets

SPIRAL VEHICLE BOX SLIDE-OUT SYSTEM

TECHNICAL FIELD

The present invention relates to the technical field of expanding the internal space of vehicles, specifically a vehicle box slide-out system with a spiral driving mechanism.

BACKGROUND OF THE INVENTION

Current vehicles and recreational vehicles, or RV's employ slide-out boxes to increase the usable space inside the RV. The exterior wall of the slide-out box aligns with the exterior of the vehicle or trailer during travel. When the vehicle stops, the slide-out box extends outward from the vehicle's opening, thereby increasing the internal usable space of the vehicle.

Pattern US201615339481A discloses a device where the slide-out mechanism is located beneath the vehicle body, lacking integrated design, occupying substantial space, inconvenient to install, and operating unstably.

Pattern US202117408020A discloses a slide-out device set on both sides of the slide-out box, but due to the complex mechanism and high extension drive device, it occupies considerable space, leads to inconvenience to maintain, and increases the usage cost.

The inventors have identified that the slide-out mechanisms of existing vehicle box slide-out systems are bulky, complex to install, and costly. Thus, the inventors believe that there is a problem with space occupation in the slide-out mechanisms of vehicle slide-out boxes.

SUMMARY OF THE INVENTION

To address the problem of large space occupation in the slide-out mechanisms of vehicle slide-out boxes, the present invention provides a spiral vehicle box slide-out system. This spiral vehicle box slide-out system is integrally mounted on the lower part of the box on both sides, bearing the weight of the slide-out box in suspension. It is used in vehicle slide-out systems to save space and improve space utilization. Since the entire slide-out mechanism inside the bearing box is integrally connected to the support frame's bottom plate, there is no need to dismantle the lower chassis of the vehicle. The system is easy to install and remove—simply fixing the support frame's bottom plate to the vehicle body allows the entire slide-out box to be set at the vehicle body's opening.

DETAILED DESCRIPTION OF THE PREFERRED EMBODIMENTS

To achieve the objectives above, the present invention adopts the following technical solutions:

A spiral vehicle box slide-out system includes a slide-out box, a spiral movement component, a driving device, a support frame, and a bearing box. The slide-out box is set at the opening of the vehicle body. The spiral movement component is fixed on the support frame. The driving device is fixed at the top inside the bearing box. The spiral movement component, driving device, and part of the support frame are integrally set inside the bearing box. The bottom of the bearing box has a long opening, through which the bearing box slides back and forth at the lower end of the support frame.

By adopting the above technical solutions, the spiral movement component, driving device, and part of the support frame are integrally set inside the bearing box, isolating the spiral movement component and drive device from external influences, facilitating installation and removal, and enhancing appearance while increasing the usable interior space of the vehicle.

Preferably, the spiral movement component includes a ball screw base, a ball screw, a ball nut, a ball nut flange, a first bearing, a second bearing, a first flange, a second flange, and a large gear. The ends of the ball screw are provided with the first and second bearings. One end of the ball screw is fixed to the first flange via the first bearing, and the other end is fixed to the second flange via the second bearing. The large gear is provided at the end of the ball screw near the first bearing, and the ball screw moves spirally within the ball nut.

By adopting the above technical solutions, the large gear drives the ball screw to move spirally within the ball nut. The ball screw rotates along its central axis, and the slide-out and retraction are realized by the forward and reverse spiral motion of the ball screw. The ball screw bears the weight of the slide-out box, transferring the weight through the balls to the ball nut, which then transfers it to the ball screw base.

Preferably, multiple circulating balls are set inside the ball nut.

By adopting the above technical solutions, the ball screw rotates in circulation with the circulating balls, reducing the friction of the ball screw's spiral motion.

Preferably, the driving device includes a driving seat, a motor, a reducer, and a pinion. The motor is installed on the driving seat, the output shaft of the motor is connected to the reducer, and the output shaft of the reducer is connected to the pinion. The motor drives the pinion through the reducer.

By adopting the above technical solutions, the driving device drives the large gear on the ball screw through the pinion, realizing the drive of the spiral movement component.

Preferably, a long adjustment hole is set at the top of the driving seat, and a driving seat fixing hole is set at the top of the bearing box, corresponding to the long adjustment hole of the driving seat.

By adopting the above technical solutions, the top of the driving seat is fixed to the top inside the bearing box through the cooperation of the long adjustment hole and the drive seat fixing hole.

Preferably, the support frame includes a top plate, a vertical plate, and a bottom plate.

By adopting the above technical solutions, the top plate of the support frame supports the spiral movement component, the long opening at the bottom of the bearing box slides out from the vertical plate of the support frame, and the bottom plate supports the entire slide-out box. There is no need to dismantle the vehicle chassis; simply fixing the bottom plate of the support frame to the vehicle body allows the entire slide-out box to be suspended at the vehicle's opening. The support frame transfers the weight of the slide-out box to the vehicle body.

Preferably, one end of the bearing box is provided with a load-bearing inspection plate, and the other end is provided with a load-bearing plate.

By adopting the above technical solutions, the load-bearing inspection plate and load-bearing plate together bear the load of the slide-out box, transferring the weight to the ball screw through the load-bearing inspection plate and load-bearing plate. The ball screw transfers the weight through the balls to the ball nut, which then transfers it to the ball screw base, and the ball screw base finally transfers the weight to the support frame, which then transfers it to the vehicle body.

Preferably, the load-bearing inspection plate is detachable.

By adopting the above technical solutions, installation is facilitated, and in case of a fault inside the bearing box, maintenance can be carried out by detaching the load-bearing inspection plate, reducing maintenance costs.

Preferably, a first flange fixing hole is set on the load-bearing inspection plate, and a second flange fixing hole is set on the load-bearing plate.

By adopting the above technical solutions, the first flange can be fixed to the load-bearing inspection plate through the first flange fixing hole, and the second flange can be fixed to the load-bearing plate through the second flange fixing hole.

Preferably, a control component is set near the bottom side of the load-bearing plate inside the bearing box.

By adopting the above technical solutions, when the slide-out box retracts and the control component detects the vertical plate of the support frame, the retraction movement stops, and the slide-out box is completely retracted.

Based on the description above, the present application includes the following beneficial technical effects:

1. Integrating the spiral movement component, driving device, and part of the support frame within the bearing box can isolate the spiral movement component and driving device from external influences. This facilitates easy installation and removal, provides an aesthetically pleasing appearance, and can increase the vehicle's interior usable space.
2. Since the entire slide-out mechanism inside the bearing box is integrally connected to the support frame's bottom plate, there is no need to dismantle the lower chassis of the vehicle. This makes installation and removal convenient. Simply fixing the support frame's bottom plate to the vehicle body allows the entire slide-out box to be set at the vehicle body's opening.
3. The load-bearing inspection plate on the bearing box is detachable. If a fault occurs inside the bearing box, it can be repaired by detaching the load-bearing inspection plate, thereby reducing maintenance costs.

By adopting these technical solutions, the invention significantly enhances the practicality and usability of slide-out systems in vehicles, making the installation process simpler and the overall system more reliable and efficient.

BRIEF DESCRIPTION OF DRAWINGS

To more clearly explain the technical solutions of the present invention, the necessary drawings for the description are briefly introduced below. It is evident that the drawings described below are only some embodiments of the present invention. For those skilled in this field, other drawings can be obtained based on these drawings without creative labor.

BRIEF DESCRIPTION OF THE FIG.S

Figure 1:
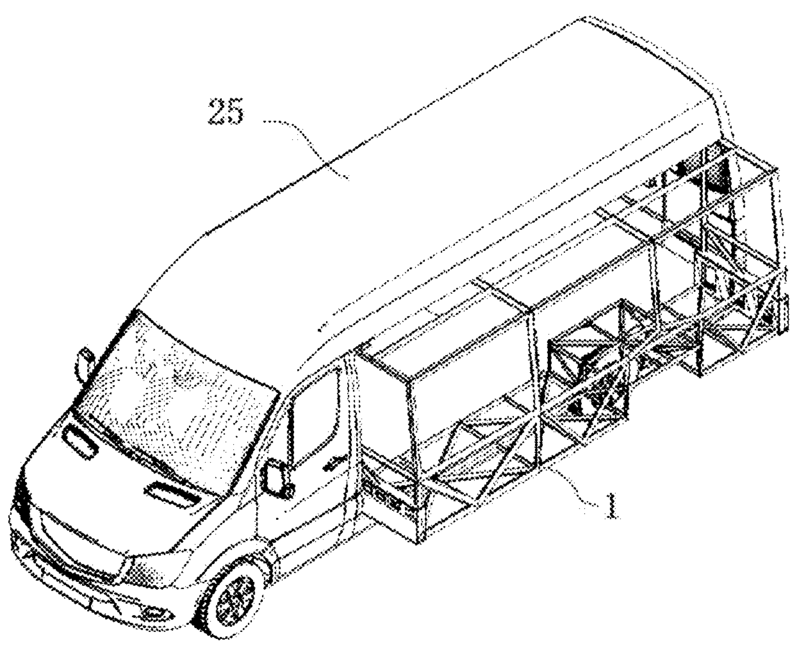
FIG. 1 is a perspective view of the slide-out box sliding out from the opening of the vehicle body in the specific embodiment of the present invention.

Follow are the reference numbers appear in the drawings:

1. Slide-out box
2. Bearing box
3. Support frame, 301. Top plate, 302 Bottom plate, 303. Vertical plate
4. Ball screw base
5. Ball screw
6. Ball nut
7. Circulating balls
8. Ball nut flange
9. Reducer
10. Motor
11. Driving seat
12. Large gear
13. Small gear;
14. Load-bearing maintenance plate;
15. Load-bearing plate;
16. Long opening;
17*a*. First flange;

17*b*. Second flange;
18*a*. First bearing;
18*b*. Second bearing;
19. First flange fixing hole;
20. Second flange fixing hole;
21. Driving seat fixing hole;
22. Long adjustment fixing hole;
23. Control component;
25. Vehicle body;
30. Spiral movement component;
34. Driving device

DETAILED DESCRIPTION OF THE INVENTION

To make the objectives, features, and advantages of the present invention more apparent and understandable, the following describes the technical solutions of the present invention clearly and comprehensively in conjunction with the accompanying drawings in specific embodiments. It is evident that the described embodiments are only part of the embodiments of the present invention and not all of them. Based on the embodiments of this patent, all other embodiments obtained by those skilled in the field without creative work fall within the scope of protection of this patent.

Figure 2:
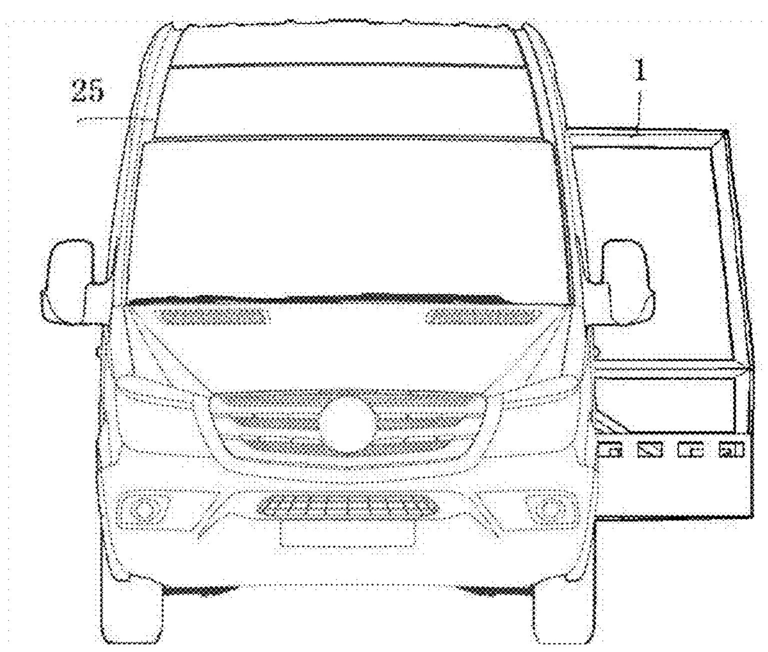
FIG. 2 is a front view of the vehicle with the slide-out box fully extended in the specific embodiment of the present invention.

Referring to FIGS. 1 and 2, when the vehicle is stationary, the slide-out box 1 fully extends from the opening of the vehicle body 25, increasing the usable space inside the vehicle body 25. After the slide-out box 1 is retracted, it aligns with the exterior of the vehicle body 25 without affecting the overall aesthetic appearance.

Figure 3:
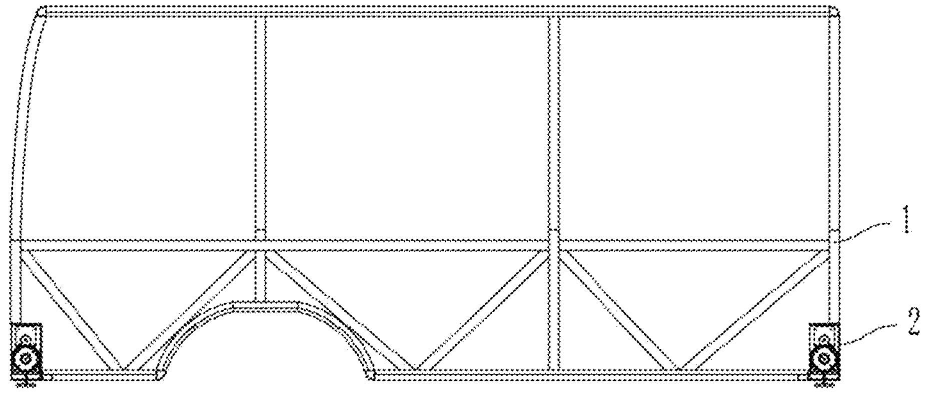
FIG. 3 is a front view of the slide-out box in the specific embodiment of the present invention.
Figure 4:
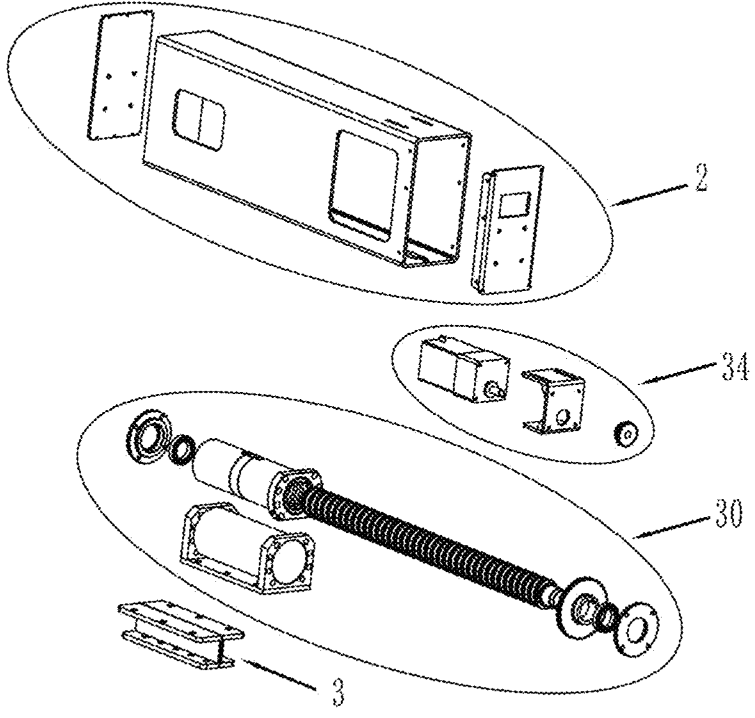
FIG. 4 is a schematic diagram of the internal mechanism of the bearing box in the specific embodiment of the present invention.

Referring to FIGS. 3 and 4, a spiral vehicle box slide-out system includes a slide-out box 1, a spiral movement component 30, a driving device 34, a support frame 3, and a bearing box 2. The slide-out box 1 is made of aluminum alloy or other light-weighted material. The bearing box 2 is fixed below the corresponding side walls of the slide-out box 1. The internal structures of the two bearing boxes 2 are identical, set correspondingly, and move synchronously, bearing the weight of the slide-out box 1. The spiral movement component 30, the driving device 34, and part of the support frame 3 are integrated inside the bearing box 2, saving space and facilitating quick installation and removal.

Figure 5:
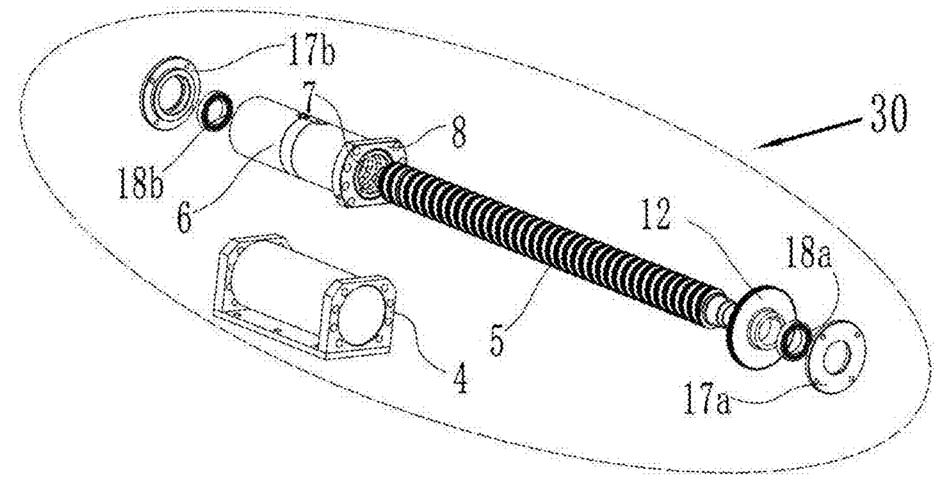
FIG. 5 is an exploded view of the spiral movement component in the specific embodiment of the present invention.

Referring to FIG. 5, the spiral movement component 30 includes a ball screw base 4, a ball screw 5, a ball nut 6, circulating balls 7, a ball nut flange 8, a first bearing 18*a*, a second bearing 18*b*, a first flange 17*a*, a second flange 17*b*, and a large gear 12. The ends of the ball screw 5 are provided with the first bearing 18*a* and the second bearing 18*b*. One end of the ball screw 5 is fixed in the first flange 17*a* through the first bearing 18*a*, and the other end is fixed in the second flange 17*b* through the second bearing 18*b*. The ball screw 5 spirally moves inside the ball nut 6, and circulating balls 7 are set inside the ball nut 6, reducing friction during spiral movement. The ball nut 6 is fixed in the ball screw base 4 through the ball nut flange 8 and remains stationary.

Figure 6:
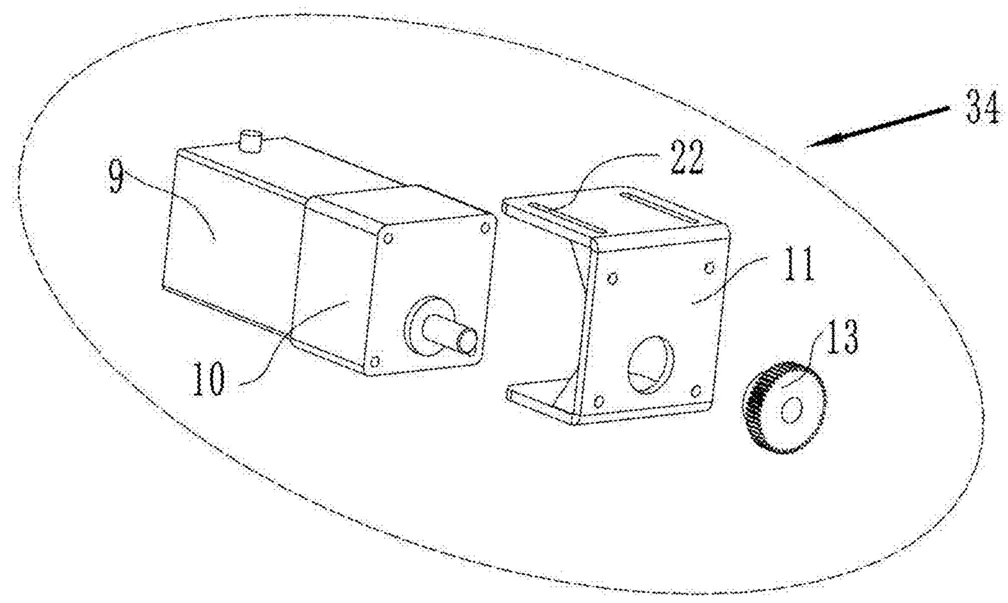
FIG. 6 is an exploded view of the driving device in the specific embodiment of the present invention.

Referring to FIG. 6, the driving device 34 includes a driving seat 11, a motor 10, a reducer 9, and a small gear 13. The motor 10 is mounted on the driving seat 11. The output shaft of the motor 10 is connected to the reducer 9, and the output shaft of the reducer 9 is connected to the small gear 13. The motor 10 drives the small gear 13 to rotate through the reducer 9. The top of the driving seat 11 is provided with a long adjustment fixing hole 22.

Figure 7:
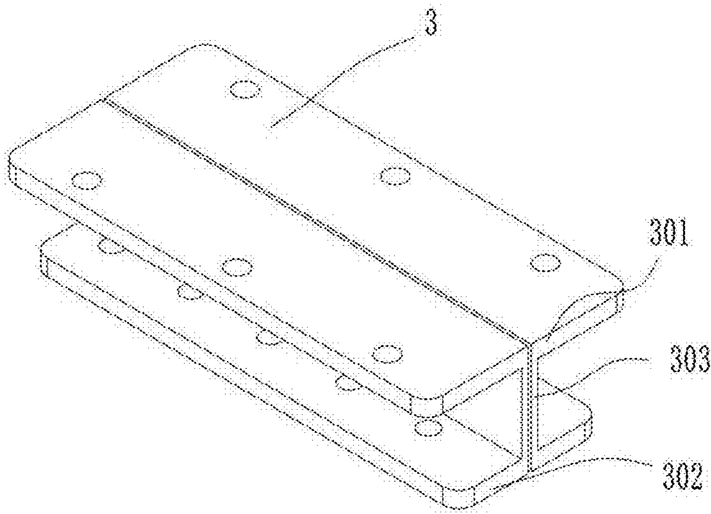
FIG. 7 is a structural schematic diagram of the support frame in the specific embodiment of the present invention.

Referring to FIG. 7, the support frame 3 includes a top plate 301, a vertical plate 303, and a bottom plate 302.

Figure 8:
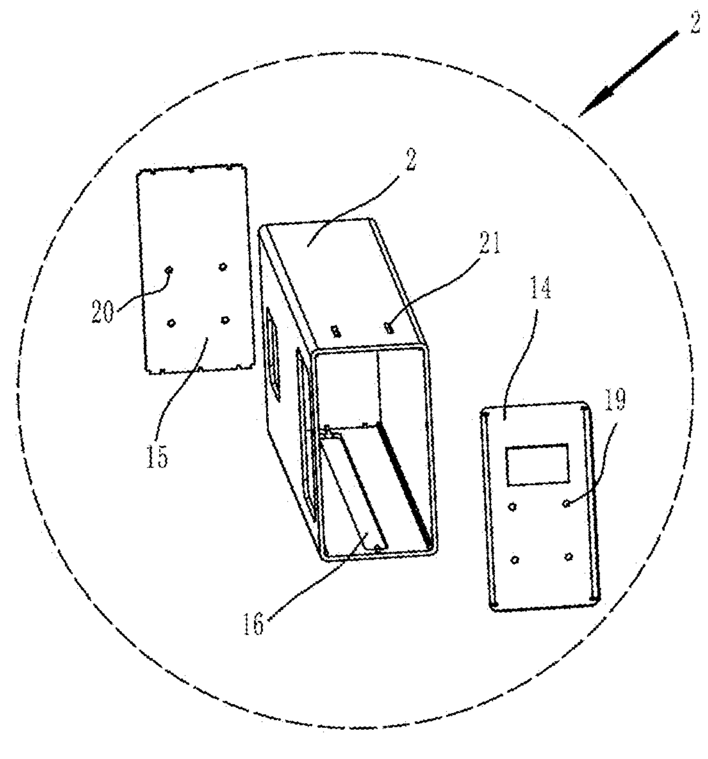
FIG. 8 is a structural schematic diagram of the bearing box in the specific embodiment of the present invention.

Referring to FIG. 8, the front and rear sides of the bearing box 2 are provided with a load-bearing maintenance plate 14 and a load-bearing plate 15. The load-bearing maintenance plate 14 is provided with a first flange fixing hole 19, and the load-bearing plate 15 is provided with a second flange fixing hole 20. The top of the bearing box 2 is provided with a driving seat fixing hole 21, and the bottom is provided with a long opening 16.

Figure 9:
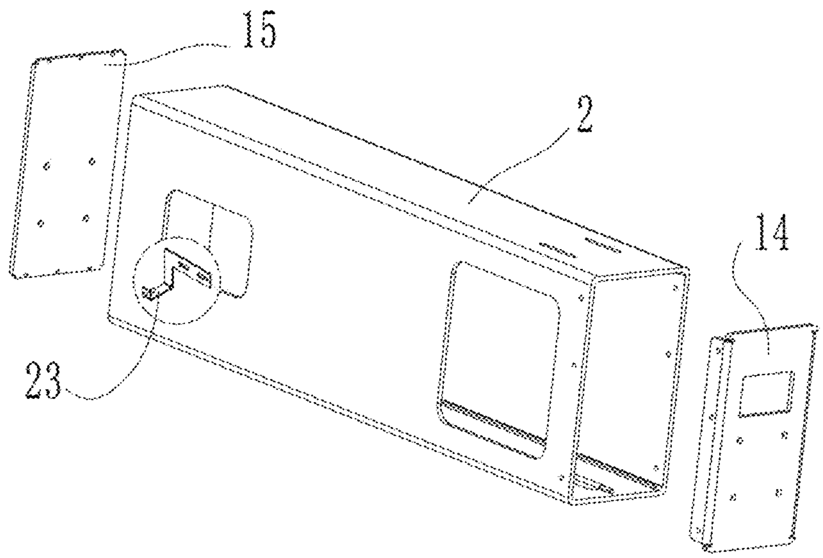
FIG. 9 is a schematic diagram of the installation structure of the control component in the specific embodiment of the present invention.

Referring to FIG. 9, a control component 23 is set at the bottom near the load-bearing plate 15 inside the bearing box 2. When the slide-out box 1 is retracted, the control component 23 detects the vertical plate of the support frame and stops the retraction movement, ensuring the complete retraction of the slide-out box 1.

Figure 10:
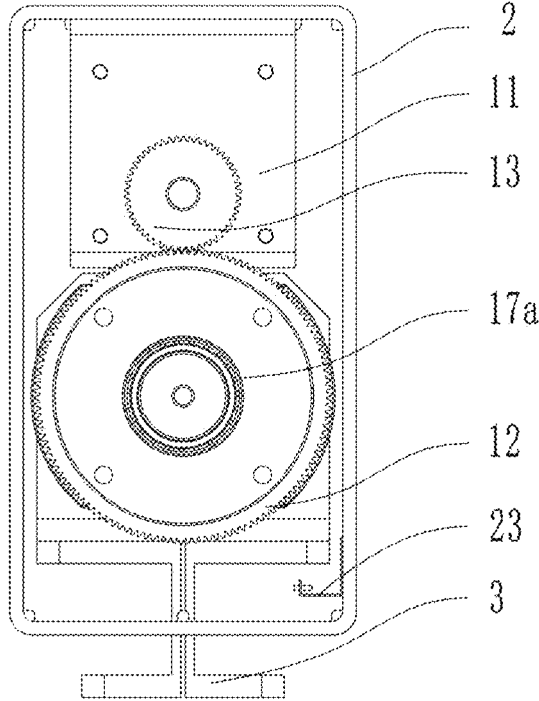
FIG. 10 is a front view of the interior of the bearing box in the specific embodiment of the present invention.

Referring to FIG. 10, it is a front sectional view of the interior of the bearing box 2, showing the engagement between the small gear 13 and the large gear 12.

Figure 11:
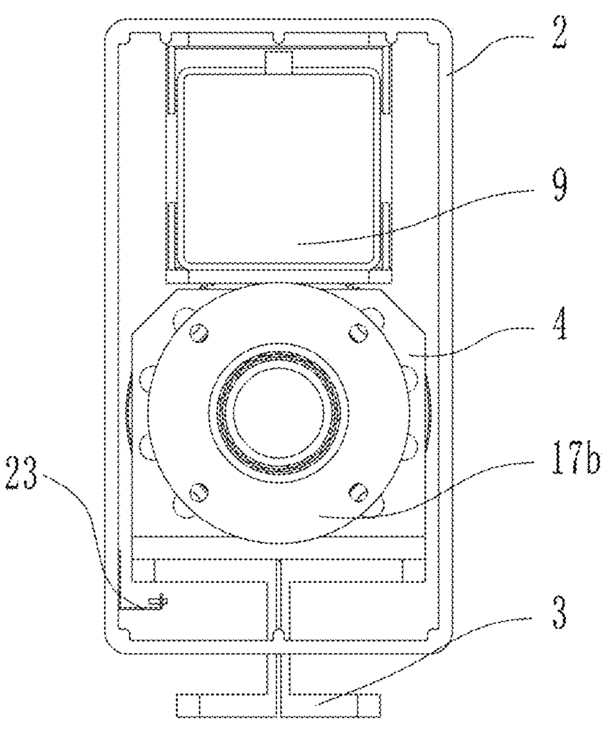
FIG. 11 is a rear view of the interior of the bearing box in the specific embodiment of the present invention.
Figure 12:
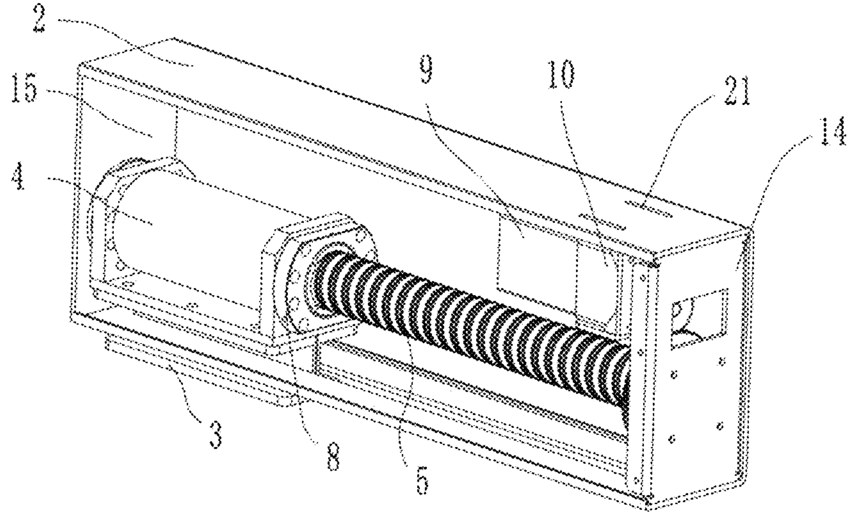
FIG. 12 is a partial expanded view of the interior of the bearing box after retraction in the specific embodiment of the present invention.
Figure 13:
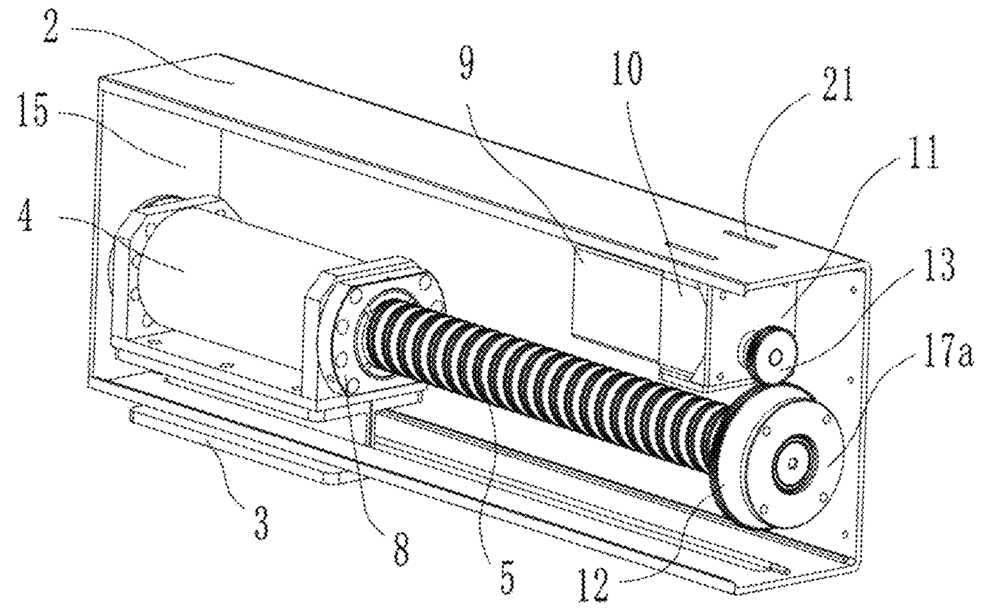
FIG. 13 is a fully expanded view of the interior of the bearing box after retraction in the specific embodiment of the present invention.
Figure 14:
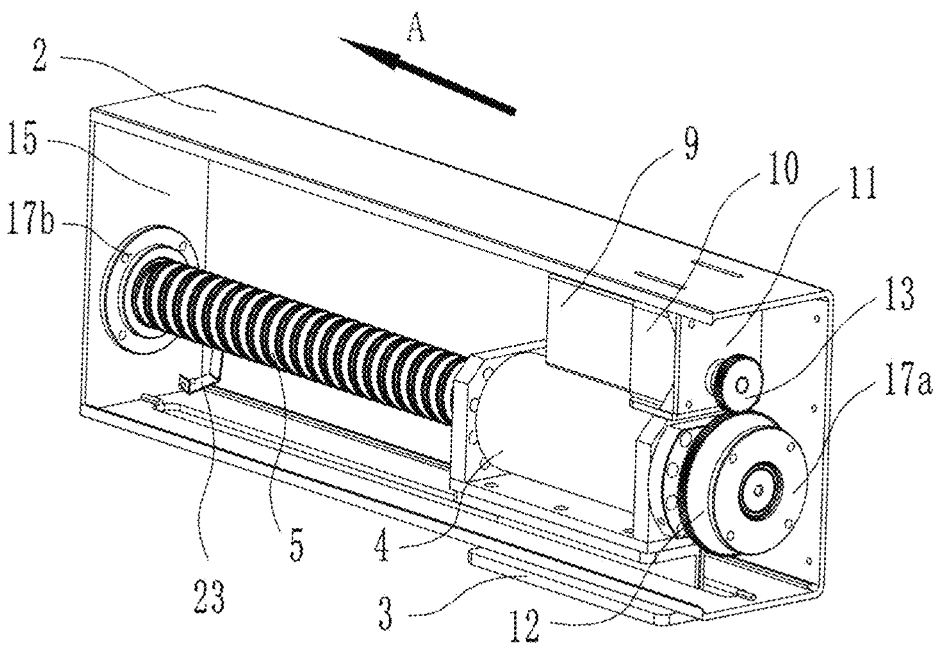
FIG. 14 is a fully expanded view of the interior of the bearing box after extension in the specific embodiment of the present invention.
Figure 15:
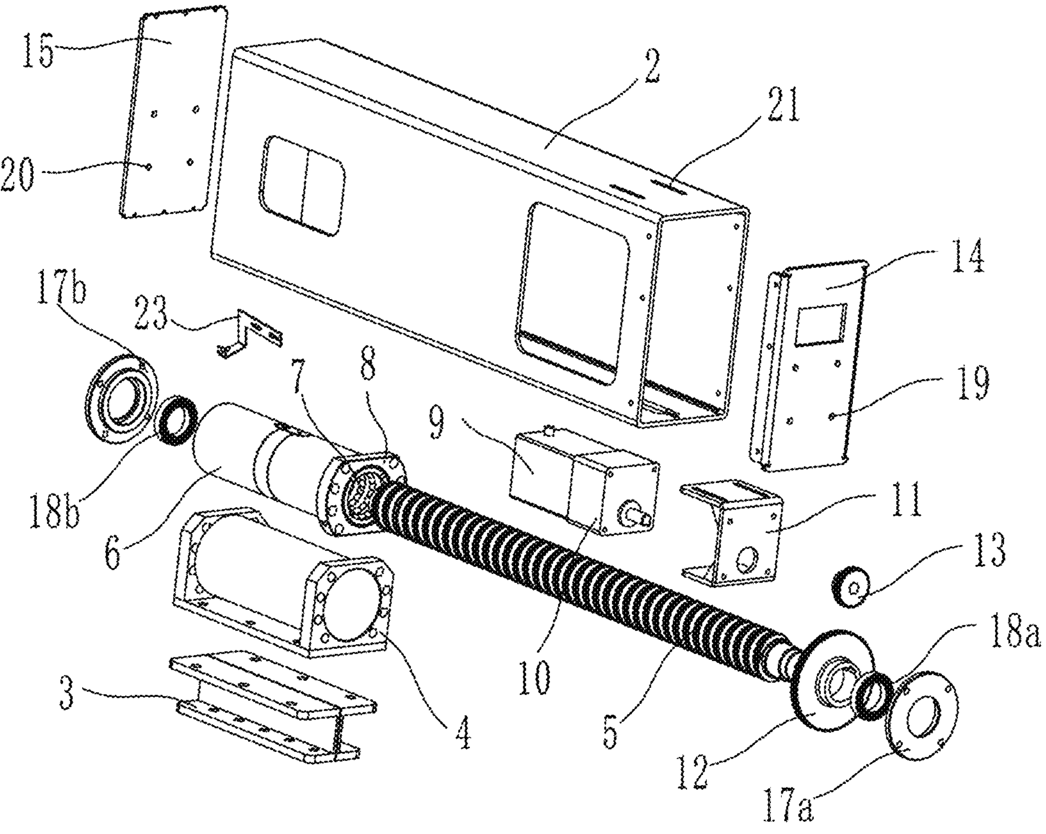
FIG. 15 is an exploded view of the box sliding system in the specific embodiment of the present invention.

Referring to FIG. 11, it is a rear sectional view of the interior of the bearing box 2, showing the connection relationship between the bearing box 2 and the support frame 3.

Referring to FIGS. 12-15, the bottom of the spiral movement component 30 is fixed on the top plate 301 of the support frame 3 through the ball screw base 4. One end of the ball screw 5 is provided with the first bearing 18*a*, and the other end is provided with the second bearing 18*b*. The first bearing 18*a* and the second bearing 18*b* are fixed on the first flange 17*a* and the second flange 17*b*, respectively. The first flange 17*a* is fixed on the load-bearing maintenance plate 14 through the first flange fixing hole 19, and the second flange 17*b* is fixed on the load-bearing plate 15 through the second flange fixing hole 20. The driving device 34 is fixed at the top inside the bearing box 2 through the long adjustment hole 22 and the driving seat fixing hole 21. The small gear 13 meshes with the large gear 12 of the spiral movement component 30. The slide-out box 1 is fixed on the vehicle body 25 through the bottom plate 302 of the support frame 3. When sliding out, it moves through the long opening 16 at the bottom of the bearing box 2. After the slide-out box 1 is extended, the bearing box 2 bears the spiral movement component 30 and the driving device 34. The weight of the slide-out box 1 is transmitted to the vehicle body 25 through the support frame 3.

Figure 16A:
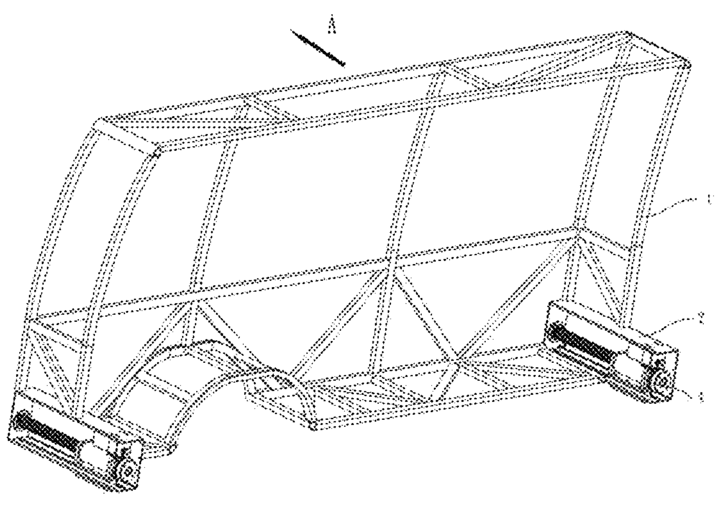
FIG. 16*a* is an oblique sectional view of the slide-out box after extension in the specific embodiment of the present invention.
Figure 16B:
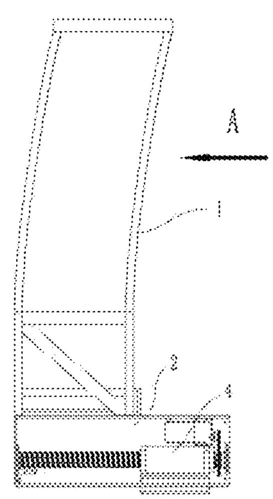
FIG. 16*b* is a side sectional view of the slide-out box after extension in the specific embodiment of the present invention.
Figure 16C:
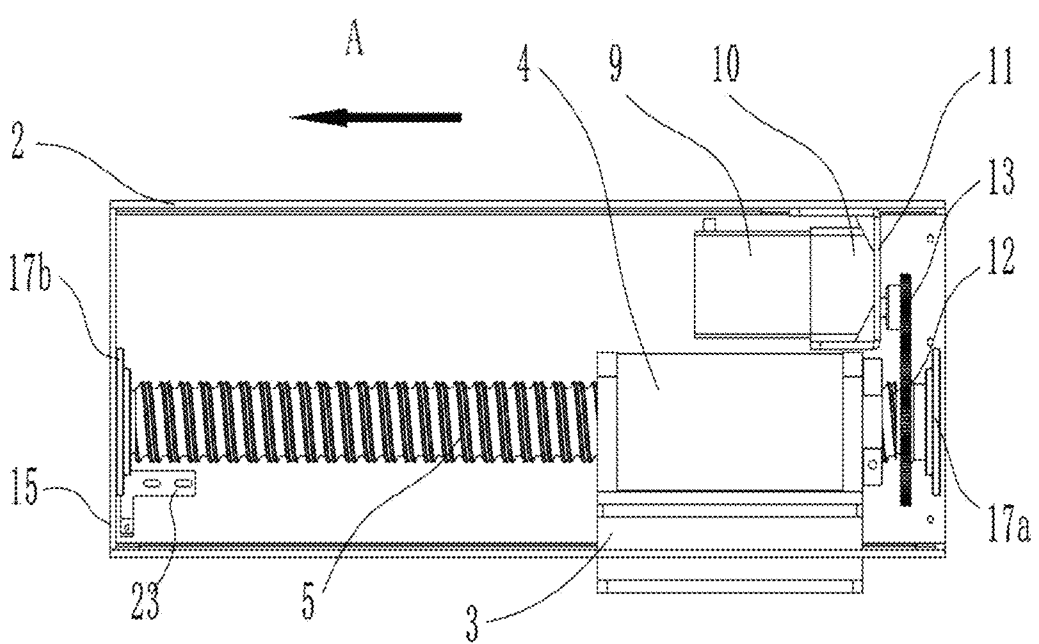
FIG. 16*c* is a schematic diagram of the internal structure of the slide-out box after extension in the specific embodiment of the present invention.

Referring to FIGS. 16*a*, 16*b*, and 16*c*, the view of the spiral vehicle slide-out system is extended, the motor 10 of the driving device 34 drives the small gear 13 to rotate through the reducer 9. The small gear 13 drives the large gear 12 to rotate. The large gear 12 drives the ball screw 5 to move spirally. The ball screw 5 rotates along its center axis and moves through the ball nut 6, driving the bearing box 2 to move as shown by arrow A. The ball nut 6 remains stationary, and the bearing box 2 drives the slide-out box 1 to extend from the opening of the vehicle body 25. The slide-out box 1 fully extends to the preset length and stops, ending the extension process. The support frame 3 remains stationary. After the slide-out box 1 is extended, the load-bearing maintenance plate 14 and the load-bearing plate 15 transmit the weight of the slide-out box 1 to the ball screw 5. The ball screw 5 transmits the weight to the ball nut 6 through the circulating balls 7. The ball nut 6 then transmits the weight to the ball screw base 4, which then transmits the weight to the support frame 3. Finally, the support frame 3 transmits the weight to the vehicle body 25.

The bearing box 2 carries the spiral movement component 30, the driving device 34, and the weight of the slide-out box 1, transmitting the weight to the vehicle body 25 through the support frame 3. The load-bearing maintenance plate 14 is detachable. When a fault occurs inside the bearing box 2, it can be repaired by removing the load-bearing maintenance plate 14 without completely opening the bearing box 2, facilitating future use. The spiral movement component 30, the driving device 34, and part of the support frame 3 are integrated inside the bearing box 2, saving space and facilitating quick installation and removal, while also providing an aesthetically pleasing appearance.

Figure 17A:
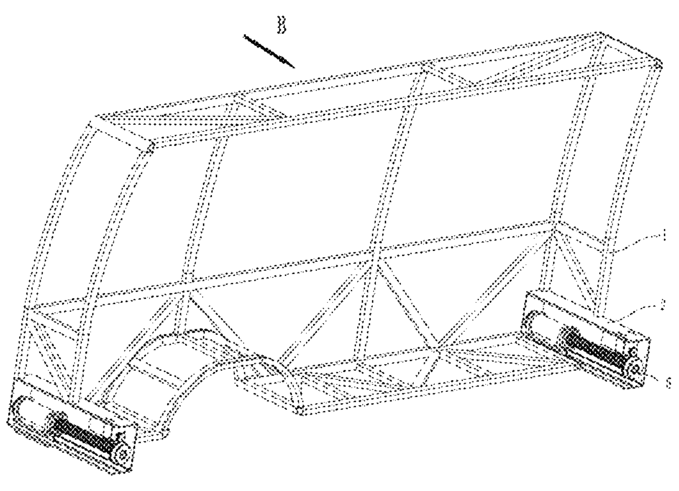
FIG. 17*a* is an oblique sectional view of the slide-out box after retraction in the specific embodiment of the present invention.
Figure 17B:
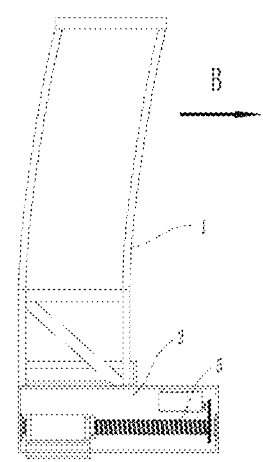
FIG. 17*b* is a side sectional view of the slide-out box after retraction in the specific embodiment of the present invention.
Figure 17C:
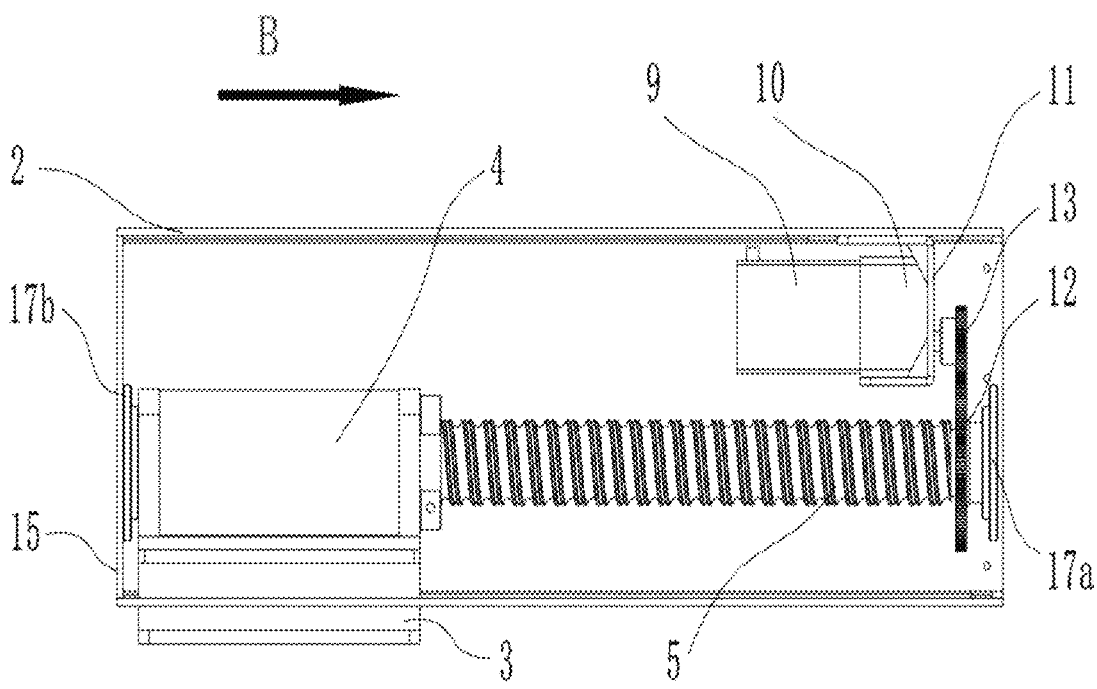
FIG. 17*c* is a schematic diagram of the internal structure of the slide-out box after retraction in the specific embodiment of the present invention.

Referring to FIGS. 17*a*, 17*b*, and 17*c*, the view of the spiral vehicle slide-out system is retracted, the motor 10 of the driving device 34 drives the small gear 13 to rotate in the opposite direction through the reducer 9. The small gear 13 drives the large gear 12 to rotate in the opposite direction. The large gear 12 drives the ball screw 5 to move in the opposite direction inside the ball nut 6 as shown by arrow B, driving the bearing box 2 to retract. The ball nut 6 remains stationary, and the ball screw 5 rotates in the opposite direction along its center axis, driving the bearing box 2 to retract into the vehicle. When the control component 23 detects the vertical plate of the support frame, the retraction movement stops, and the slide-out box 1 is fully retracted.

The above description of the disclosed embodiments enables those skilled in the art to implement or use the present invention. Various modifications to these embodiments will be apparent to those skilled in the art. The general principles defined herein may be applied to other embodiments without departing from the spirit or scope of the invention.

The invention claimed is:

1. A spiral vehicle box slide-out system, comprising a slide-out box, a spiral movement component, a driving device, a support frame, and a bearing box, wherein the slide-out box is arranged at an opening of a vehicle body, the spiral movement component is fixed on the support frame, the driving device is fixed at the top inside the bearing box, and the spiral movement component, the driving device, and part of the support frame are integrated inside the bearing box, the bottom of the bearing box is provided with a long opening, and the bearing box slides back and forth through the long opening at the lower end of the support frame.

2. The spiral vehicle box slide-out system according to claim 1, characterized in that the spiral movement component comprises a ball screw base, a ball screw, a ball nut, a ball nut flange, a first bearing, a second bearing, a first flange, a second flange, and a large gear, wherein both ends of the ball screw are provided with the first bearing and the second bearing, one end of the ball screw is fixed to the first flange through the first bearing, the other end of the ball screw is fixed to the second flange through the second bearing, the ball screw is provided with the large gear near one end of the first bearing, and the ball screw moves spirally inside the ball nut.

3. The spiral vehicle box slide-out system according to claim 2, characterized in that the ball nut is provided with circulating balls.

4. The spiral vehicle box slide-out system according to claim 1, characterized in that the driving device comprises a driving seat, a motor, a reducer, and a small gear, the motor is installed on the driving seat, the output shaft of the motor is connected to the reducer, the output shaft of the reducer is connected to the small gear, and the motor drives the small gear to rotate through the reducer.

5. The spiral vehicle box slide-out system according to claim 4, characterized in that the driving seat is fixedly connected to the bearing box.

6. The spiral vehicle box slide-out system according to claim 1, characterized in that the support frame comprises a top plate, a vertical plate, and a bottom plate, and remains stationary.

7. The spiral vehicle box slide-out system according to claim 1, characterized in that one end of the bearing box is provided with a load-bearing maintenance plate, and the other end is provided with a load-bearing plate.

8. The spiral vehicle box slide-out system according to claim 7, characterized in that the load-bearing maintenance plate is detachable.

9. The spiral vehicle box slide-out system according to claim 7, characterized in that the load-bearing maintenance plate is provided with a first flange fixing hole, and the load-bearing plate is provided with a second flange fixing hole.

10. The spiral vehicle box slide-out system according to claim 9, characterized in that a control component is arranged at the bottom near the load-bearing plate inside the bearing box.

11. The spiral vehicle box slide-out system according to claim 10, characterized in that the slide-out box is parallel to the ball screw.

12. The spiral vehicle box slide-out system according to claim 1, characterized in that it performs parallel spiral movement between the slide-out position and the retracted position, and when in the retracted position, the slide-out box is flush with the exterior of the vehicle body, and the spiral movement component and the bearing box are not visible from the outside of the vehicle body.

* * * * *